March 31, 1964 C. C. EVANS 3,127,185
OIL SEALS
Filed Feb. 19, 1959 2 Sheets-Sheet 1
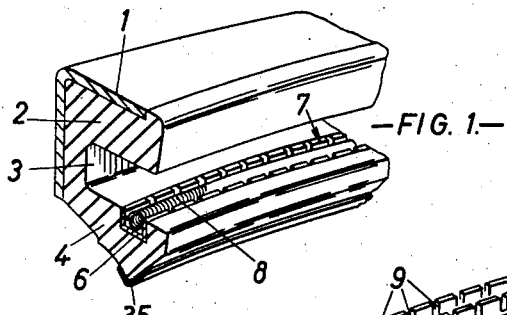
—FIG. 1.—
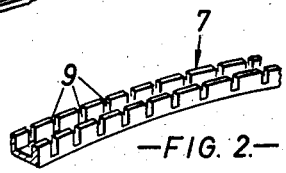
—FIG. 2.—
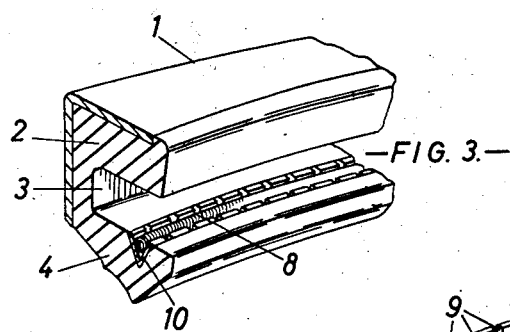
—FIG. 3.—
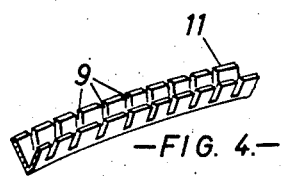
—FIG. 4.—
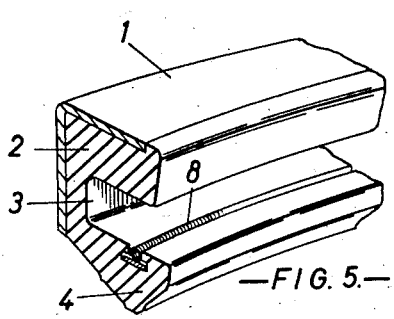
—FIG. 5.—
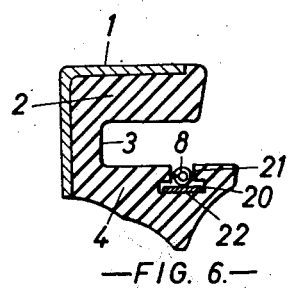
—FIG. 6.—

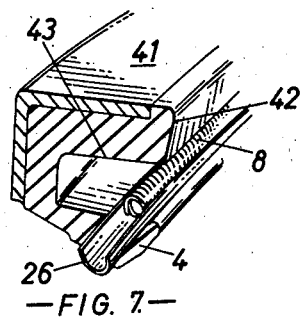
FIG. 7.—
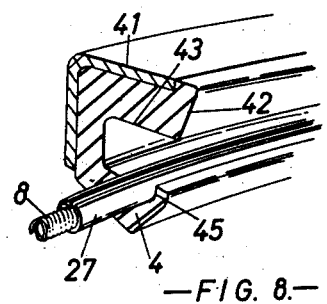
FIG. 8.—
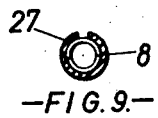
FIG. 9.—
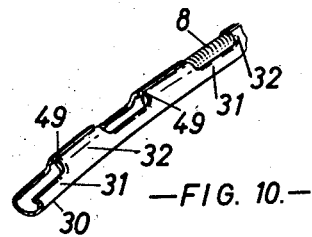
FIG. 10.—
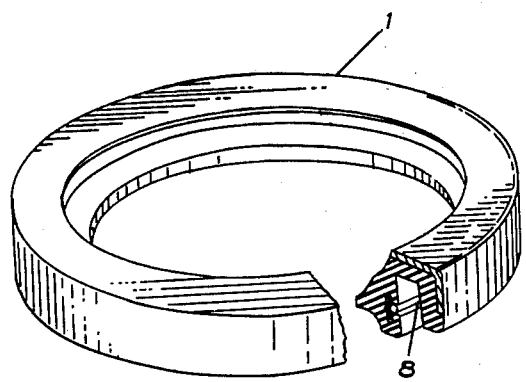
FIG. 11—

United States Patent Office 3,127,185
Patented Mar. 31, 1964

3,127,185
OIL SEALS
Cyril Charles Evans, 6 Shrubbery Road,
Weston-Super-Mare, England
Filed Feb. 19, 1959, Ser. No. 794,333
18 Claims. (Cl. 277—146)

The present invention relates to oil seals of the kind comprising an annular sealing member of oil resisting resilient material such as synthetic rubber formed with a sealing lip for engagement with a member to be sealed (such as a shaft or housing) and in which the sealing lip is encircled by a spring, usually a helically coiled spring, to hold it in engagement with the member to be sealed. Such oil seals are used to restrict the ingress of fluids, abrasives and the like fouling matter into bearing surfaces of a bearing and to restrict the egress of lubricants from the bearing.

The present invention resides in the provision of flexible strip-like intermediate means of material harder than that of the lip interposed between the spring and the lip of the seal over substantially the whole length of the spring, the construction and arrangement of said intermediate means being such that it can flex with flexures of the spring and allows the spring to exert pressure on the lip while preventing it from becoming embedded in the material of the lip thereby enabling the spring to work more freely. In many forms of construction the cross-sectional shape of said intermediate means will correspond to the cross-sectional shape of a circumferentially extending groove in the lip of the seal into which it engages. It is a feature of the present invention that the said intermediate means has no positive connection with the seal and remains in position by virtue of its interposition between the lip of the seal and the spring.

The aforesaid strip-like intermediate means may be of metal, for example steel, or a suitable non-metallic material harder than the material of the lip such as polythene, nylon or polytetrafluoroethylene. The intermediate means should be capable of moving circumferentially in a groove in the lip of the seal and the material thereof should thus be such as to enable the surface thereof to offer a relatively low frictional resistance to such movement. The intermediate means may comprise a single intermediate strip-like member or two or more intermediate strip-like members substantially completely encircling the lip of the seal beneath the spring.

Said intermediate means should be so shaped in cross section and/or so disposed on or in the lip of the seal as to locate the spring in the axial direction of the seal.

The invention is especially although not exclusively applicable to oil seals for shafts of relatively large diameter such as are used in metal rolling mills and which by virtue of their duty are subject to considerable radial displacement in their bearings of the order of say two thousandths of an inch per inch of diameter and where, to avoid loss of lubricant through the oil seal, it is necessary that the oil seal should be able by flexure of the material thereof to follow displacements of the shaft very rapidly.

The hardness of the resilient material of which oil seals are made may vary according to the nature of their duty but the material of an oil seal is never very hard and never sufficient to prevent the convolutions of a coil from embedding themselves therein if the spring is allowed to contract, as is usual, directly on the material of the seal. Embedding of a coil spring in the lip of the seal interferes with the free working of the convolutions of the spring and tends to rigidify the sealing lip itself and thus to impede rapid flexure of the lip as is required for following the shaft.

Furthermore, engagement of a coil spring directly against the material of the lip of the seal tends to apply pressure at a number of spaced localities beneath the convolutions rather than continuously around the periphery of the lip. Various suggestions have been made for holding the spring away from the lip at intervals along its length but this to a greater extent tends to result in the application of pressure on the lip at spaced intervals instead of continuously around the lip with a resultant tendency to leakage. The present invention on the contrary allows application of spring pressure more uniformly and continuously around the lip while holding the spring out of direct contact with the material of the lip.

Because the present invention avoids the danger of embedding of the spring in the lip and distributes the spring pressure continuously around the lip it is possible with the present invention to use stronger springs than might otherwise be used, thereby enhancing the speed of adjustment of the lip to changes in position of the shaft.

Seals according to the present invention may embody springs of piston ring form instead of helically coiled springs.

The invention is further described by way of example with reference to the accompanying drawings in which:

FIG. 1 is a fragmentary perspective view of one preferred form of oil seal according to the invention;

FIG. 2 is a fragmentary perspective view of the strip-like intermediate means used in the seal of FIG. 1;

FIGS. 3 and 4 are views corresponding to FIGS. 1 and 2 illustrating a second form of oil seal according to the invention;

FIG. 5 is a view corresponding to FIG. 1 illustrating a third form of oil seal;

FIG. 6 is a fragmentary sectional view illustrating the sealing lip of FIG. 5 to a slightly larger scale;

FIGS. 7 and 8 are views corresponding to FIG. 1 illustrating a fourth and fifth form of oil seal;

FIG. 9 is a sectional view of the intermediate member of FIG. 8;

FIG. 10 is a perspective view illustrating an alternative form of strip-like intermediate means; and FIG. 11 is a perspective view partly broken away of a seal according to FIGS. 5 and 6.

The oil seals illustrated fragmentarily in FIGS. 1, 3, 5, 7 and 8 are largely similar and comprise a rigid outer cup 1 into which a resiliently deformable sealing ring 2 is bonded. Sealing ring 2 has a circumferentially extending recess 3 which forms a sealing lip 4. The inner face of the lip 4 is formed with a circumferentially extending groove in which a circumferentially extending spring 8 is located with a flexible strip-like intermediate means between the spring 8 and at least the base of the groove. The general shape of the complete seals illustrated fragmentarily in FIGS. 1, 3, 5, 7 and 8 is shown in FIG. 11. These seals differ only in the cross sectional shape of the said circumferentially extending groove and in the form of the intermediate means which in FIG. 11 correspond to FIGS. 5 and 6.

The invention can, however, be applied to any form of seal of the character hereinbefore set forth.

The lip 4 of FIG. 1 has a circumferentially extending groove 6 which is of rectangular cross-section and which receives a flexible strip-like intermediate member 7 likewise of rectangular cross-section. The size of the member 7 is such that it fits snugly in the groove 6 but is able to slide therein. The coil spring 8 encircling the lip 4 is received in the intermediate member 7 and applies inward pressure to the lip 4 through the member 7. The ends of the member 7 can be arranged to interfit with one another but permitted to draw apart during flexing of the spring 8.

In this particular example the side walls of the member 7 are slotted as at 9 to increase the flexibility thereof but these slots may be omitted. The slots 9 may be made of any convenient width.

The seal illustrated in FIGS. 3 and 4 has a sealing lip 4 formed with a circumferentially extending groove 10 of V-shaped cross-section to receive a strip-like intermediate member 11 of corresponding V-shaped cross-section as illustrated more particularly in FIG. 4. The spring 8 engages in the V of the intermediate member 11 whose two arms are formed with slots 9 as in the construction according to FIGS. 1 and 2.

The sealing lip 4 of FIGS. 5 and 6 has an undercut groove therein axially wider at its inner end 20 than over the remainder 21 of its depth. A flat strip-like intermediate member 22 is located in the wider end 20 of the groove and the width of the wider end 20 is such as comfortably to accommodate the member 22 (which is wider than the remainder 21 of the depth of the groove) so as to permit of sliding movement of member 22 therein. The remainder 21 of the groove is of appropriate width to enable it comfortably to receive the spring 8.

A flat strip-like intermediate member similar to the intermediate member 22 shown in FIG. 5 could be used in conjunction with a lip 4 having a circumferential groove of rectangular section as in FIG. 1.

The lip 4 of each of the seals of FIGS. 7 and 8 is formed with a circumferentially extending groove of arcuate (i.e. part circular) cross-section to receive, respectively, intermediate members 26, 27 likewise of arcuate cross-section. The intermediate member 26 of FIG. 7 is relatively shallow and not more than semi-circular in cross-section and its curvature is such as comfortably to accommodate the spring 8. The intermediate member 27 of FIG. 8 is more nearly circular in cross-section with a circumferentially extending gap along its outer periphery (as illustrated in FIG. 9) and of diameter such as to enable it comfortably to accommodate the spring 8.

The strip-like intermediate member 30 illustrated in FIG. 10 may be used with the oil seal of FIG. 7 or FIG. 8 instead of the intermediate member 26 or 27. It is of arcuate and approximately semi-circular cross-section over spaced portions 31 thereof and of more nearly circular cross-section over the intervening portions 32 of its length.

The inwardly directed crown of the lip 4 which engages with the rotating member to be sealed may be lined with a thin strip of polytetrafluoroethylene tape 35 (FIG. 1) capable of minizing friction between the crown of the lip and the rotating member without significantly impairing the resilience of the crown of the lip. Alternatively, the crown of the lip may contain polytetrafluoroethylene.

The intermediate members illustrated in the drawings have for the sake of clarity been drawn thicker than would usually be the case. The material of which they are made should be harder than the material of the lip to prevent the convolutions of the spring from embedding themselves therein to any significant extent. The nature of the material and its thickness should be such as to render the intermediate members flexible to enable them to follow any distortion of the lip and subsequent restoration thereof to its normal shape as may arise through sudden radial displacement of a shaft sealed thereby. The nature of the material of and the surface finish of the intermediate means should be such as to enable the intermediate means to move circumferentially in the groove in which it engages in the lip of the seal.

The intermediate members may be formed of metal such as steel or of any other suitable non-metallic material capable of enabling the intermediate members to serve the purpose herein set forth, for example, polythene, nylon or polytetrafluoroethylene.

The intermediate means of each seal may comprise a single intermediate member extending around substantially the whole circumference of the lip 4 or it may comprise a number of shorter intermediate members arranged in series and together extending around substantially the whole circumference of the lip. A single intermediate member capable of extending around the whole circumference of the lip should be capable of being sprung outwardly sufficiently to enable it to be engaged over the lip and into the circumferential groove in the lip. When an intermediate means is comprised of a number of intermediate members the members may be arranged slidingly to telescope one into another at their ends or if not so arranged their overall length should be such as to afford relatively short gaps between their ends.

If the intermediate means comprise a single intermediate member then the ends of the single intermediate member may likewise be slidingly telescopic, or alternatively, the ends thereof may be spaced apart by a relatively short gap.

I claim:

1. An oil seal of the kind comprising an annular sealing member of oil resisting resilient material such as synthetic rubber formed with an annular flexible sealing lip for engagement with a member to be sealed such as a shaft or housing, a spring encircling the sealing lip and applying radially inward pressure thereon for holding it in engagement with the member to be sealed, and a thin flexible and locally deformable strip-like intermediate means of material harder than that of the lip interposed continuously between the lip and the spring over the whole length of the spring and being free of and relatively movable with respect to the seal, the spring being in contact with and pressing radially inwardly upon the radially outer face of said intermediate means whose inner face is in contact with and transmits pressure from the spring radially inwardly upon the lip, the construction and arrangement of said intermediate means being such that it can flex with flexure of the spring and allows the spring to exert pressure on the lip while preventing it from becoming embedded in the material of the lip thereby enabling the spring to work more freely.

2. A seal according to claim 1 in which said intermediate means is capable of circumferential displacement relatively to the seal.

3. A seal according to claim 1 in which the lip has a circumferential groove therein and said intermediate means engages in the groove.

4. An oil seal according to claim 3 in which the groove is flat bottomed and said intermediate means is substantially flat in cross-section and engages the flat bottom of the groove.

5. An oil seal according to claim 4 in which at its inner end the groove is wider than over the remainder of its depth and said flat sectioned intermediate means is wider than the width of the groove over said remainder of its depth.

6. An oil seal according to claim 3 in which the intermediate means is of channel-shaped cross-section corresponding to the cross-sectional shape of said groove.

7. An oil seal according to claim 6 in which the groove and intermediate means are of V-shaped cross-section.

8. An oil seal according to claim 7 in which the side walls of said V-shaped intermediate means are slotted from the free edges thereof to render them more flexible.

9. An oil seal according to claim 6 in which the groove and intermediate means are of rectangular cross-section.

10. An oil seal according to claim 9 in which the side walls of said rectangular shaped intermediate means are slotted from the free edges thereof to render them more flexible.

11. An oil seal according to claim 3 in which said groove and said intermediate means are of part circular cross-section.

12. An oil seal according to claim 11 in which the cross-sectional shape of said intermediate means is nearly circular there being a gap between the opposite side walls thereof in the region of the outer periphery of the intermediate means.

13. An oil seal according to claim 11 in which said intermediate means is of approximately semi-circular cross-section over spaced circumferential portions thereof and of more nearly circular cross-section over the intervening portions thereof.

14. An oil seal according to claim 1 in which said intermediate means comprises a single intermediate member extending around substantially the whole circumference of the lip.

15. An oil seal according to claim 1 in which said intermediate means comprises a number of intermediate members arranged in series and together extending around substantially the whole circumference of the lip.

16. An oil seal according to claim 1 in which said intermediate means is formed of steel.

17. An oil seal according to claim 1 in which said intermediate means is formed of a non-metallic material.

18. An oil seal according to claim 17 in which said intermediate means is formed of or contains polytetrafluoroethylene.

References Cited in the file of this patent

UNITED STATES PATENTS

| | | |
|---|---|---|
| 2,168,818 | Condon | Aug. 8, 1939 |
| 2,202,908 | Hubbard | June 4, 1940 |
| 2,326,489 | Payne | Aug. 10, 1943 |
| 2,434,484 | Chambers | Jan. 13, 1948 |
| 2,613,962 | Dahl | Oct. 14, 1952 |
| 2,750,212 | Skinner | June 12, 1956 |
| 2,816,784 | Stucke | Dec. 17, 1957 |
| 2,932,535 | Peickii et al. | Apr. 12, 1960 |

FOREIGN PATENTS

| | | |
|---|---|---|
| 507,540 | Canada | Nov. 23, 1954 |